(No Model.) 2 Sheets—Sheet 1.
F. LANSBERG.
AIR BRAKE.
No. 415,522. Patented Nov. 19, 1889.
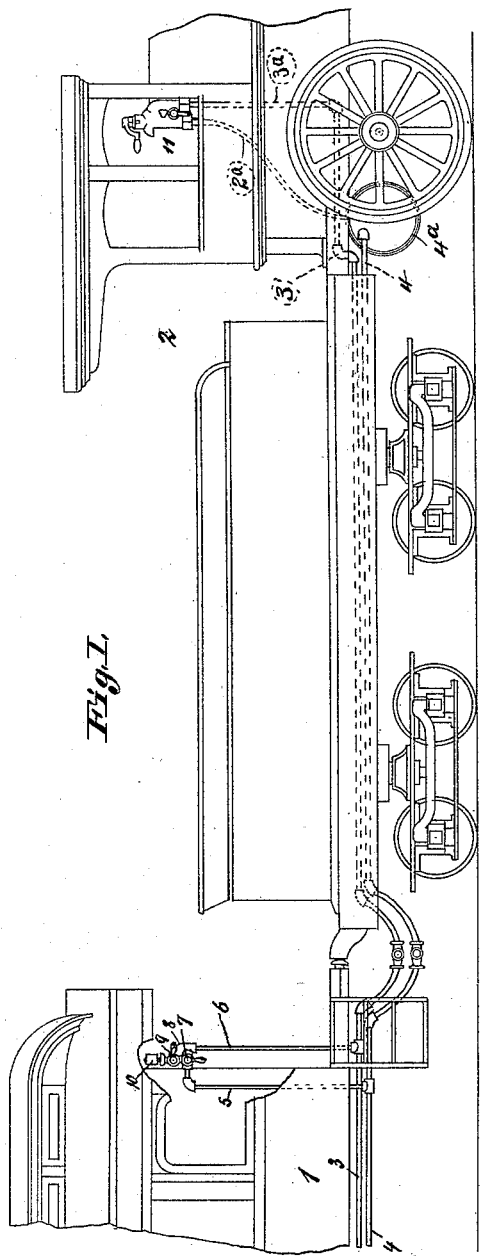
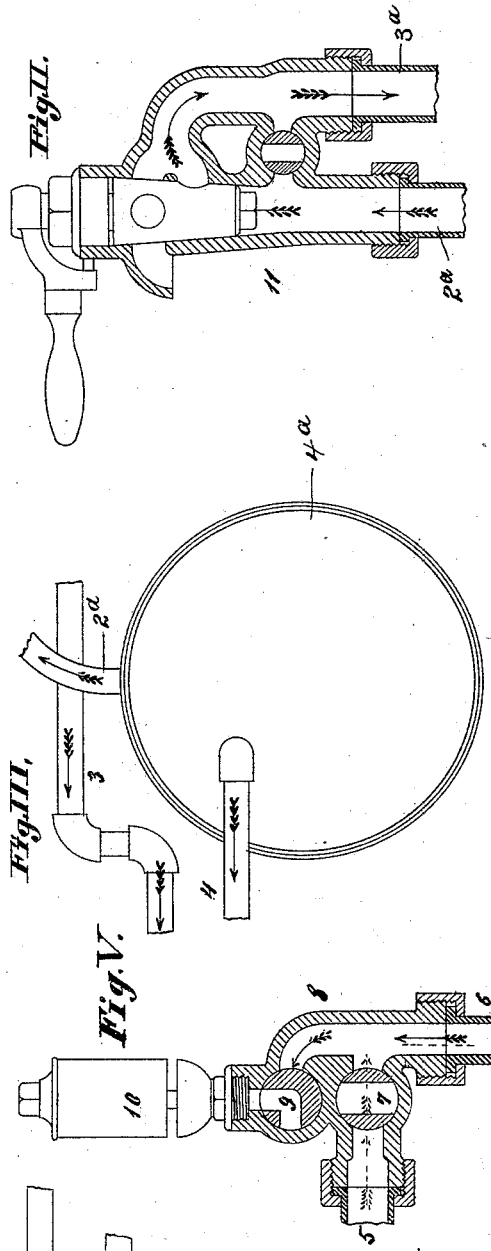
Attest:
E. Arthur
Geo. E. Cruse
Inventor:
Frank Lansberg
By Knight Bros
attys

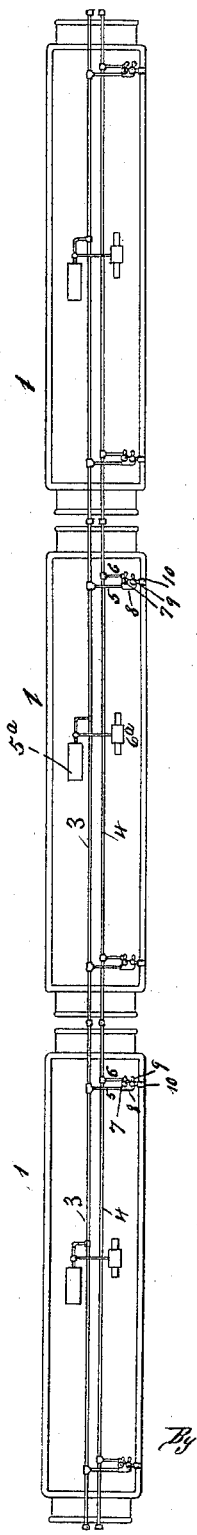

UNITED STATES PATENT OFFICE.

FRANK LANSBERG, OF ST. LOUIS, MISSOURI, ASSIGNOR TO THE LANSBERG BRAKE COMPANY, OF EAST ST. LOUIS, ILLINOIS.

AIR-BRAKE.

SPECIFICATION forming part of Letters Patent No. 415,522, dated November 19, 1889.

Application filed August 27, 1889. Serial No. 322,107. (No model.)

*To all whom it may concern:*

Be it known that I, FRANK LANSBERG, of the city of St. Louis, in the State of Missouri, have invented a certain new and useful Improvement in Air-Brakes, of which the following is a full, clear, and exact description, reference being had to the accompanying drawings, forming part of this specification.

My invention relates to certain improvements in air-brakes for railway-cars, and has for its object to produce an arrangement whereby the brakeman or other person may apply the brakes, remove them, and give an alarm back of the locomotive.

Heretofore it has been customary to provide a means for the application of the brakes back of the locomotive; but no means, to my knowledge, has been provided for releasing the brakes back of locomotive or for giving a signal.

My invention consists in features of novelty hereinafter fully described, and pointed out in the claims.

Figure I is a side elevation illustrative of my invention. Fig. II is a vertical section through an engineer's valve and its housing. Fig. III is a detail view showing one of the receivers and parts of the pipes. Fig. IV is a detail view of the pipes. Fig. V is a view of the valves arranged in the pipes back of the locomotive, and Fig. VI is a diagram showing a number of cars provided with my improved device.

Referring to the drawings, 1 represents a number of cars, and 2 the locomotive of a railway-train.

3 represents the train-pipe of the brake system, which is connected to the auxiliary reservoirs $5^a$ and brake-cylinders $6^a$, for charging them by manipulating the engineer's valve in the usual manner, and 4 is the receiver or high-pressure pipe. These pipes run the length of the train, being coupled between the cars by suitable joints. They are connected by pipes 5 and 6, in which a valve 7 is located by the use of a suitable housing 8. The pipes 5 and 6 may be of any desired length and may extend to any desired part of the car, and they may, if desired, be simply short pipes connecting the pipes 3 and 4, with the valve 7 between them.

In Fig. I, I have shown the pipes 5 and 6 extending vertically from the pipes 3 and 4 and extending up to near the top of the car, where the valve 7, with its housing, is located; but I do not confine myself to this arrangement, as a very different arrangement might be made, and it is only necessary that access may be had to the valve 7. In the housing 8, as shown clearly in Fig. V, is a second valve 9, over which is located a signal-whistle 10. As already stated, the pipes 3 and 4 extend the length of the train, and each car may be provided, if desired, with the pipes 5 and 6 and the valves 7 and 8.

Now, if it is desired to apply the brakes, it will be seen that the conductor, brakeman, switchman, or other person can by operating the valve 9 release the pressure in the pipe 3, and the brakes will be applied after the usual manner of what is known as the "Westinghouse system." Before applying the brakes, or at any other time, by opening the valve 9 for a very short space of time a signal may be given to the engineer by the whistle 10. The signal may be repeated as often as desired by simply opening and closing the valve 9 rapidly while the air is exhausting from the train-pipe 3. After the brakes are applied they may be released by closing the valve 9 and opening communication between the pipes 5 and 6 (and consequently between the pipes 3 and 4) through means of the valve 7—that is, the conductor may release the brakes by raising the pressure in the train-pipe 3 to a sufficient degree to cause the usual automatic valve (not shown) to shift, and thereby allow the air to exhaust from the brake-cylinders $6^a$ into the atmosphere; and the pipe 4 being connected directly with the high-pressure reservoir $4^a$ on the engine, it is of course understood that the pressure in the train-pipe 3 will, when cock 7 is opened, be raised considerably above that in the brake-cylinders. I thus afford means for applying and releasing the brakes back of the locomotive without interfering with the engineer's valve 11, (which is shown in detail in Fig. II, but as to which no invention is claimed in this application,) and also signaling the engineer, so that he may be informed of the fact.

The engineer's valve 11 is connected in the usual manner to the train-pipe and main reservoir—that is, by pipe $3^a$ with the train-pipe and by pipe $2^a$ with the reservoir $4^a$.

I claim as my invention—

1. In an air-brake, the combination of the train and receiver pipes, connection between the pipes, and valves located in said connection, whereby the brakes may be applied and released back of the locomotive, substantially as and for the purpose set forth.

2. In an air-brake, the combination of the train and receiver pipes, a connection between the pipes, and a valve located in said connection, whereby the brakes can be released back of the locomotive, substantially as set forth.

3. In an air-brake, the combination of the train and receiver pipes, a connection between the pipes and valves, and a whistle located in said connection, whereby the brakes may be applied and released and the signal given back of the locomotive, substantially as set forth.

4. In combination with a number of cars, the pipes 3 and 4, connecting-pipes 5 and 6, valves 7 and 9, and whistle 10, substantially as and for the purpose set forth.

FRANK LANSBERG.

In presence of—
E. S. KNIGHT,
THOMAS KNIGHT.